(12) United States Patent
Watanabe

(10) Patent No.: US 10,090,092 B2
(45) Date of Patent: Oct. 2, 2018

(54) SOLENOID VALVE FOR HYDRAULIC CONTROL

(71) Applicant: DENSO CORPORATION, Kariya, Aichi-pref. (JP)

(72) Inventor: Katsumi Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/274,134

(22) Filed: Sep. 23, 2016

(65) Prior Publication Data

US 2017/0110230 A1   Apr. 20, 2017

(30) Foreign Application Priority Data

Oct. 19, 2015 (JP) .................. 2015-205403

(51) Int. Cl.
| | |
|---|---|
| *H01F 7/128* | (2006.01) |
| *F16K 11/07* | (2006.01) |
| *F16K 31/06* | (2006.01) |
| *H01F 7/16* | (2006.01) |
| *F16K 27/04* | (2006.01) |
| *H01F 6/06* | (2006.01) |
| *H01F 5/04* | (2006.01) |
| *H01F 5/02* | (2006.01) |
| *H01F 7/06* | (2006.01) |

(52) U.S. Cl.
CPC .............. *H01F 7/128* (2013.01); *F16K 11/07* (2013.01); *F16K 27/048* (2013.01); *F16K 31/0613* (2013.01); *F16K 31/0675* (2013.01); *H01F 7/1607* (2013.01); *H01F 6/06* (2013.01); *H01F 2005/027* (2013.01); *H01F 2005/043* (2013.01); *H01F 2005/046* (2013.01); *H01F 2007/062* (2013.01)

(58) Field of Classification Search
CPC .............. F16K 27/048; F16K 31/0613; H01F 2007/062; H01F 7/128; H01F 2005/027; H01F 2005/043; H01F 2005/046; H01F 6/06
See application file for complete search history.

(56) References Cited

U.S. PATENT DOCUMENTS 5,681,099 A * 10/1997 Steffes ................. B60T 8/3675
                                                          137/884
5,895,026 A *  4/1999 Linkner, Jr. ......... B60T 8/3615
                                                          251/129.15

(Continued)

*Primary Examiner* — Matthew W Jellett
*Assistant Examiner* — Christopher Ballman

(57) ABSTRACT

A solenoid valve includes a spool valve and a linear solenoid. The spool valve is used inside a hydraulic oil. The linear solenoid includes a resin cylindrical bobbin, a coil, and a case. The solenoid valve further includes a projecting portion, a first terminal, a first coil lead wire, a slit, a first coating portion, and a second coating portion. Each of the first coil lead wire and the second coil lead wire includes an exposed portion. The slit separates an electrical connection between the first terminal and the first coil lead wire from an electrical connection between the second terminal and the second coil lead wire. The first coating portion is formed by coating an entire surface of the exposed portion of the first coil lead wire. The second coating portion is formed by coating an entire surface of the exposed portion of the second coil lead wire.

4 Claims, 7 Drawing Sheets

(56) References Cited

U.S. PATENT DOCUMENTS

| | | | |
|---|---|---|---|
| 8,193,890 B2* | 6/2012 | Gonzalez Romero | H01F 5/02 251/129.15 |
| 8,279,030 B2* | 10/2012 | Baker | H01F 5/06 324/319 |
| 8,534,641 B2* | 9/2013 | Schalowski | B60T 8/3675 251/129.15 |
| 8,600,463 B2* | 12/2013 | Kramer | H01L 39/16 336/DIG. 1 |
| 8,851,447 B2* | 10/2014 | Crist | A01G 25/16 239/69 |
| 9,184,524 B2* | 11/2015 | Tomita | H01F 7/06 |
| 2006/0132268 A1* | 6/2006 | Hirabayashi | F02N 11/00 335/126 |
| 2007/0229207 A1 | 10/2007 | Adunka et al. | |
| 2009/0130868 A1* | 5/2009 | Schenk | H01R 4/183 439/81 |
| 2009/0315655 A1* | 12/2009 | Damiani | G01R 33/3806 335/216 |
| 2012/0154079 A1 | 6/2012 | Sasao et al. | |
| 2012/0228534 A1* | 9/2012 | Kellner | H01F 5/02 251/129.15 |
| 2015/0027573 A1* | 1/2015 | Ochiai | F01L 1/34 137/625.65 |

\* cited by examiner

SOLENOID VALVE FOR HYDRAULIC CONTROL

CROSS REFERENCE TO RELATED APPLICATION

This application is based on reference Japanese Patent Application No. 2015-205403 filed on Oct. 19, 2015, the disclosure of which is incorporated herein by reference.

TECHNICAL FIELD

The present disclosure relates to a solenoid valve for hydraulic control used in hydraulic oil.

BACKGROUND

Conventionally, a linear solenoid type valve (hereinafter, referred to as a "solenoid valve") has been used as a hydraulic oil controlling device for an automatic transmission system for a vehicle. The solenoid valve is generally configured to selectively open and close an oil passage by moving an axial direction. A variety of solenoid valves have been provided. Patent Literature 1 (JP 2012-134234 A), for example, discloses one example of such a solenoid valve.

This solenoid valve generally includes a spool valve and a linear solenoid. The spool valve is operated to move along an axial direction to control a pressure of the hydraulic oil. The linear solenoid operates the spool valve to move the axial direction.

The liner solenoid includes a resin-made cylindrical bobbin, a coil, a case, and a connector. The resin-made cylindrical bobbin has flanges at both ends of the resin-made cylindrical bobbin. The coil is formed of an insulating coated wire wound around the cylindrical bobbin. The case houses a solenoid coil portion formed of the cylindrical bobbin and the coil. The connector is used to electrically connect an external equipment.

Since the solenoid valve is used in the hydraulic oil, a coil assembly has been typically used for the linear solenoid. The coil assembly has a molding structure where the solenoid coil portion and the connector are integrally molded with molding resin.

It should be noted that the coil molding portion and the connector are formed at the same time by insert-molding (i.e., secondary molding) the solenoid coil portion and a terminal with molding resin after electrically connecting the winding start end and the winding terminal end of the coil to the terminal for the external equipment.

In a system, such as an automatic transmission system for a vehicle, which is installed in an engine room and plays a pivotal role for vehicle control, demand for downsizing and cost reduction to the system including its components has been increased year and year. Therefore, there is highly demand to components, such as a solenoid valve serving as a main component for the system, for downsizing and cost reduction.

A variety of trials had been made to achieve downsizing and cost reduction. Each time, a linear solenoid was a target because the linear solenoid required an expensive manufacturing facility (a molding device) and included a coil assembly having a large size. However, it would tend to avoid simplifying an insulating structure for the coil assembly because of safety aspects considering operating conditions where the coil assembly was immersed in the hydraulic oil during its operation.

Therefore, a measure contributing to downsizing and cost reduction of the linear solenoid by simplifying an insulating structure is required.

In view of the above, it is an objective of the present disclosure to provide a solenoid valve for hydraulic control that satisfies demand for downsizing and cost reduction.

SUMMARY

An aspect of the present disclosure is a solenoid valve for hydraulic control. The solenoid valve includes a spool valve and a linear solenoid. The spool valve is used inside a hydraulic oil. The spool valve controls a pressure of the hydraulic oil. The linear solenoid operates the spool valve to move along an axial direction. The linear solenoid includes a resin cylindrical bobbin, a coil, and a case. The resin cylindrical bobbin includes two flanges at both ends of the resin cylindrical bobbin. The coil is formed of an insulating coated wire that is wound around the resin cylindrical bobbin. The case houses the resin cylindrical bobbin and the coil. The solenoid valve further includes a projecting portion, a first terminal, a first coil lead wire, a slit, a first coating portion, and a second coating portion. The projecting portion is integrally formed with the one of the two flanges of the resin cylindrical bobbin. The projecting portion is used for wire connection at an outside of the case. The first terminal and a second terminal are arranged to be away from each other in a plate width direction perpendicular to a protruding direction of the projecting portion. The first and second terminals serve as a pair of connecting terminals for an external equipment. The first coil lead wire and a second coil lead wire are a winding start end and a winding terminal end of the coil, respectively, and are arranged along the projecting portion. The first coil lead wire includes an exposed portion where insulating coating is removed from the insulating coated wire and the first terminal is electrically connected. The second coil lead wire includes an exposed portion where insulating coating is removed from the insulating coated wire and the second terminal is electrically connected. The slit is recessed from a distal end of the projecting portion toward a root portion of the projecting portion along the protruding direction. The slit separates an electrical connection between the first terminal and the first coil lead wire from an electrical connection between the second terminal and the second coil lead wire in the plate width direction. The first coating portion is formed by coating an entire surface of the exposed portion of the first coil lead wire including the electrical connection between the first terminal and the first coil lead wire with a coating resin. The second coating portion is formed by coating an entire surface of the exposed portion of the second coil lead wire including the electrical connection between the second terminal and the second coil lead wire with a coating resin.

Therefore, insulating coating is applied independently to the electric connections led to an outside of the case, and the solenoid coil portion having the bobbin and the coil can be housed in the case without being molded. Thus, the linear solenoid can be manufactured without an expensive molding facility. Furthermore, only the coating portions by the coating resins serve as insulating structures for the connection portions. Hence, the size of the linear solenoid as a whole can be decreased and the structure of the linear solenoid can be simplified.

Furthermore, the coating resin even with a small amount can be surely applied to the entire surfaces of insulating coating removed portions (the exposed portions). Therefore, the exposed portions can be prevented from being directly exposed to the hydraulic oil. Furthermore, a space between the insulating connection portions is separated by the slit, deposition of the "contamination" in the space can be prevented.

As a result, the linear solenoid capable of dealing with the peculiarity of the hydraulic oil can be provided, which is easily manufactured by applying the coating resin only to the insulating coating removed portions (the exposed portions). Therefore, the solenoid valve for hydraulic control that satisfies the demand for downsizing and cost reduction can be presented.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

The inventors of the present disclosure have studied the linear solenoid technology in terms of safety aspects, and identified the following concerns.

1. The Peculiarity of Hydraulic Oil 1-1. Effects of Additives to Hydraulic Oil

A variety of additives are mixed with hydraulic oil to improve its performance. There is a concern how such additives affect the insulating structure of the liner solenoid.

1-2. Effects of "Contamination (Foreign Matter)" Mixed with Hydraulic Oil

Although hydraulic oil itself basically has electrical insulating property, it is difficult to prevent conductive foreign matter, such as metallic wear debris, from being mixed with the hydraulic oil during operation. There is a concern how such conductive foreign material affects the insulating structure of the linear solenoid.

2. Simplification of the Insulating Structure and Relevancy to the Peculiarity 2-1. Typically, a so-called "enameled wire", which is inexpensive and has high versatility, is used as an insulating coated wire that forms a coil. The enameled wire is formed by applying insulating coating to an outer surface of a wire formed of copper (Cu). In contrast, sulfate ion and/or nitrate ion, which have corrosiveness to Cu composition through a chemical change of additives, are generated in the hydraulic oil. Therefore, if an insulating coating removed portion (an exposed portion) is formed in the coil, there is need to protect the exposed portion from being exposed to the hydraulic oil.

2-2. The winding start end and the winding terminal end of the coil are electrically connected to a terminal for an external equipment. In this case, the electrical connecting positions of the winding start end and the winding terminal end are required to be close to each other due to design requirement of the external equipment. In such a case, if conducting foreign material deposits in the space between the insulating connections, a short may occur.

In view of the described concerns, the present disclosure provides a plurality of embodiments as described below. It is needless to say that the embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

(Embodiment)

In the present embodiment, a solenoid valve for hydraulic control applied to a hydraulic system of an automatic transmission system for a vehicle will be described. One example of the function of the solenoid valve in the automatic transmission system is schematically described with reference to FIG. 6.

Figure 6:
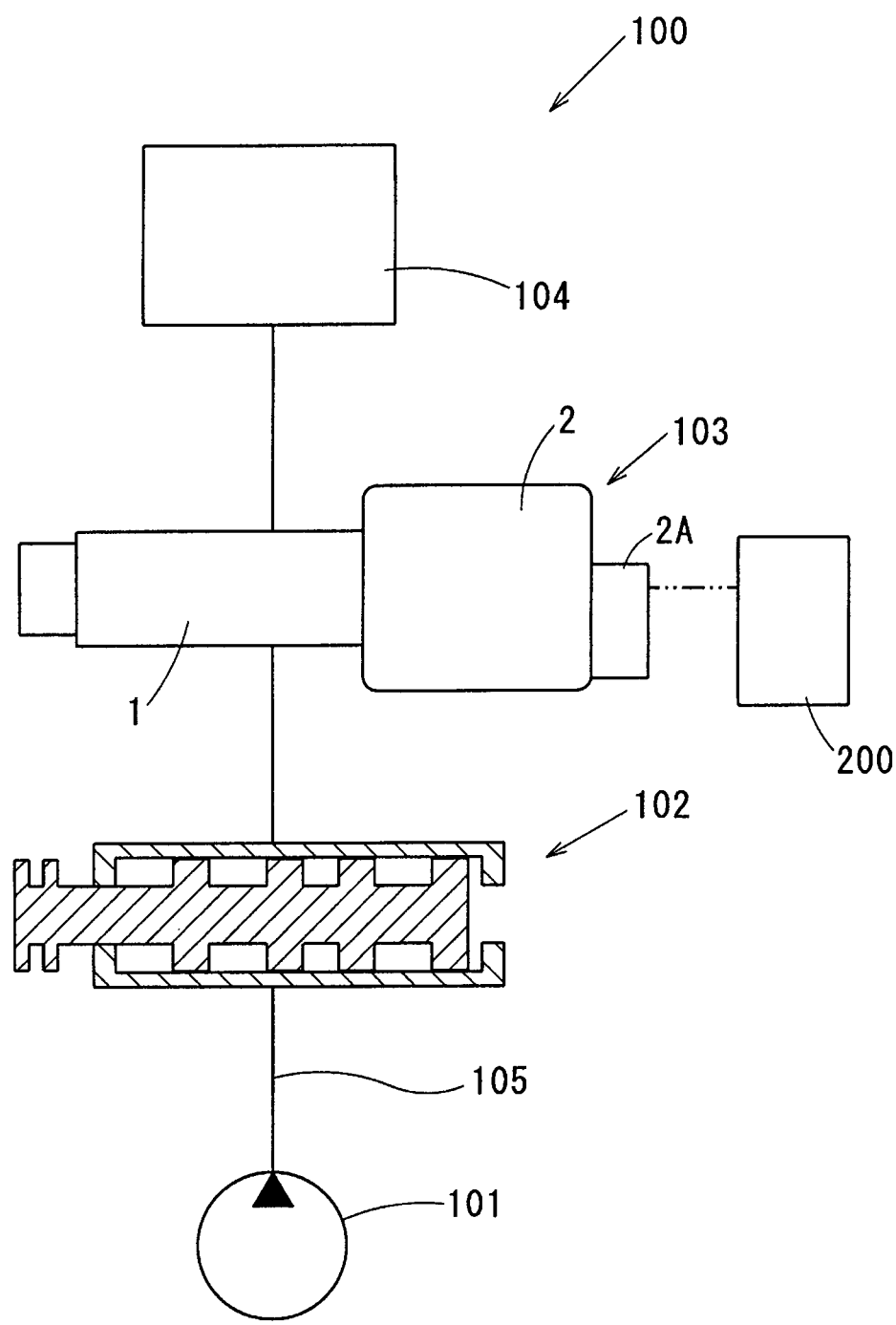
FIG. 6 is a schematic view of a hydraulic system in the automatic transmission system for a vehicle to which the solenoid valve for hydraulic oil is applied.

As shown in FIG. 6, the hydraulic system 100 of the automatic transmission system includes an oil pump 101, a manual valve 102, a hydraulic control solenoid valve 103, a clutching mechanism 104, and a hydraulic pipe 105.

The oil pump 101 serves as a hydraulic oil supplying source for the hydraulic system 100. The oil pump 101 draws a hydraulic oil (hereinafter, may be referred to as merely an "oil") from a sump for storing the oil, such as an oil pan (not shown), and supplies the oil to the manual valve 102 through the hydraulic pipe 105. The manual valve 102 selects a mode from P (Parking), R (Reverse), N (Neutral), and D (Drive) in response to manipulation of a select lever (not shown).

The solenoid valve for hydraulic control (hereinafter, referred collectively to as a "solenoid valve") 103 selectively opens and closes an oil supply passage to the clutching mechanism 104 and adjusts a supply pressure of the oil during D mode. The solenoid valve 103 includes a spool valve 1 and a linear solenoid 2 that serves as an actuator to operate the spool valve 1. The spool valve 1 and the linear solenoid 2 are coaxially arranged and the solenoid valve 103 is mounted to a vehicle so that the axis of the solenoid valve 103 extends along a horizontal direction in the sump. Therefore, the solenoid valve 103 is used in a state where the solenoid valve 103 is immersed in the oil.

The solenoid valve 103 operates when receiving control signals from an electronic control unit (ECU) 200. The solenoid valve 103 includes a power receiver 2A to be electrically connected with an external equipment at a side of the solenoid valve 103 close to the linear solenoid 2.

It should be noted that the ECU 200 includes an integrating controller that outputs control signals necessary for each components so that required transmission control can be performed according to operating conditions of the vehicle.

Next, the structure of the solenoid valve 103 will be described in detail with reference to FIG. 1.

The solenoid valve 103 generally includes the spool valve 1 and the linear solenoid 2 to operate the spool valve 1 to move along the axial direction. The spool valve 1 includes a sleeve 3, a spool 4, a spring 5, and a receiver 10.

The sleeve 3 has a cylindrical shape and forms a valve housing. The sleeve 3 is formed of a non-magnetic metallic material, such as an aluminum alloy. The sleeve 3 includes a through hole 6 that passes through the sleeve 3 along the axial direction and a plurality of oil ports 7. The plurality of the oil ports 7 are arranged along the through hole 6 and each of the oil ports 7 passes through a wall of the sleeve 3 in a radial direction. Each of the oil ports 7 includes an inlet 7a in communication with the manual valve 102, an outlet 7b in communication with the clutching mechanism 104, a discharging opening 7c, and a breathing opening 7d.

The spool 4 serves as a valve body that operates in association with the valve housing. The spool 4 is slidably housed in the sleeve 3. The spool 4 includes a plurality of lands 8 (for example, three lands 8a, 8b and 8c are shown in FIG. 1) and a small diameter portion 9. The lands 8 are tightly fit into the through hole 6 and divide the plurality of oil ports 7. The small diameter portion 9 is positioned between the land 8b and the land 8c. The spool 4 changes the opening degree of each of the oil ports 7 according to the position of the spool 4 relative to the sleeve 3. Furthermore, the spool 4 switches the states of the oil ports 7a to 7d between a communication state and a closed state according to the position of the spool 4 relative to the sleeve 3.

The spring 5 generates a biasing force to press the spool 4 toward one side of the axial direction (toward the liner solenoid 2). The spring 5 serves as a biasing member that controls displacement of the spool 4 along the axial direction by offsetting an electromagnetic force by the linear solenoid 2. The spring 5 can be a compression coil spring.

The receiver 10 is an adjustment member called as a screw adjustor. The receiver 10 is attached to an end portion of the sleeve 3 through a screw adjustment mechanism 11. By changing a threading amount of the screw adjustment mechanism 11, the position of the receiver 10 relative to the sleeve 3 along the axial direction is changed, whereby a biasing force of the spring 5 (an attachment load) can be continuously adjusted (increase or decrease).

Next, the linear solenoid 2 will described in detail below.

The linear solenoid 2 includes a solenoid coil 13, a stator core 14, a plunger 15, a shaft 16, a yoke 17, a ring core 18, and an axially biasing member 19 besides the power receiver 2A.

The solenoid coil 13 generates a magnetic force when energized to form a magnetic circuit through the stator core 14, the yoke 17, and the plunger 15.

The stator core 14 is formed of a magnetic metallic material such as iron. The stator core 14 includes a magnetic attracting core 14a, a magnetic shield 14b, and a guiding core 14c that are integrally arranged along the axial direction. The stator core 14 has a cylindrical shape as a whole.

The plunger 15 is formed of a magnetic metallic material such as iron to have a columnar shape. The plunger 15 is reciprocatabe along an inner circumferential surface of the guiding core 14c in the axial direction. The plunger 15 includes a breathing hole 15a passing through the plunger 15 in the axial direction.

The shaft 16 is slidably supported by the magnetic attracting core 14a and is interposed between the spool 4 and the plunger 15. The spring 5 biases the spool 4 toward the shaft 16, whereby one end of the shaft 16 is brought into contact with the spool 4, whereas the other end of the shaft 16 is brought into contact with an end surface of the plunger 15.

The yoke 17 is formed of magnetic metallic material such as iron. The yoke 17 has a cup shape with a cylindrical portion 17a and a bottom portion 17b. The yoke 17 serves as a case that houses the solenoid coil 13, the stator core 14, and the ring core 18. The cylindrical portion 17a fixes the stator core 14 (the side of the magnetic attracting core 14a) to the sleeve 3 and magnetically connects the stator core 14 (the side of the magnetic attracting core 14a) to the yoke 7 by bending an opening end of the cylindrical portion 17a to engage with the sleeve 3.

The ring core 18 is formed of magnetic metallic material such as iron to have an annular shape. The ring core 18 supports the magnetic connection between the stator core 14 and the yoke 17. The ring core 18 is biased against the bottom portion 17b of the yoke 17 due to the biasing force of the axially biasing member 20 interposed between the ring core 18 and the solenoid coil 13.

In this way, the solenoid coil 13 is fixedly held within the yoke 17.

Next, operation of the solenoid valve 103 will be described below.

When the solenoid coil 13 is not energized, the magnetic attracting core 14a of the stator core 14 does not generate a magnetic attracting force (an electromagnetic force). Thus, the spool 4, the shaft 16, and the plunger 15 are biased toward a right direction in FIG. 1 by a biasing force of the spring 5. Then, the end surface of the plunger 15 is in contact with the bottom portion 17b of the yoke 17.

In this state, the oil flowing in from the inlet 7a flows out through a space between the land 8b and the land 8c to the discharging opening 7c. Therefore, the clutching mechanism 104 does not operate.

When the solenoid coil 13 is energized, the magnetic attracting core 14a of the stator core 14 generates a magnetic attracting force and the plunger 15 is attracted. Then, the plunger 15 causes the spool 4 to move in the left direction of FIG. 1 through the shaft 16. In this point, the oil on the side of the shaft 16 of the plunger 15 flows out toward a rear side of the plunger 15 through the breathing hole 15a according to the movement of the plunger 15. Accordingly, pressure fluctuation at both sides of the plunger 15 can be prevented.

Under this state, the land 8c closes the discharging opening 7c, and therefore the oil flowing in from the inlet 7a flows out through the space between the land 8b and the land 8c toward the outlet 7b. Accordingly, the clutching mechanism 104 operates. Furthermore, a portion of the oil flowing out of the outlet 7b returns to the breathing opening 7d.

The ECU 200 as the integrating controller of the automatic transmission system repeats the non-energizing state (Off) and the energizing state (Off) by duty control.

As described above, the solenoid valve 103 is used inside the old (hydraulic oil). Therefore, the solenoid valve 103 is required to have a structure suitable for the operation inside the oil. Especially, since the side of solenoid valve 103 close to the linear solenoid 2 performs exchanging control signals with the ECU 200, such a structure is highly required.

The solenoid valve 103 includes an insulating structure for the linear solenoid 2, more specifically, includes a connecting structure between the solenoid coil 13 and the power receiver 2A, and the insulating structure for protecting the connecting structure, as will be described below.

Next, the insulating structure for the linear solenoid 2 will be mainly described with reference to FIGS. 2 to 5.

In the linear solenoid 2, the solenoid coil 13 and the power receiver 2A are separately disposed with respect to the yoke 17 as a case (hereinafter, referred to as a "case 17"). That is, the solenoid coil 13 is housed inside the case 17, and the power receiver 2A is disposed outside of the case 17.

Figure 1:
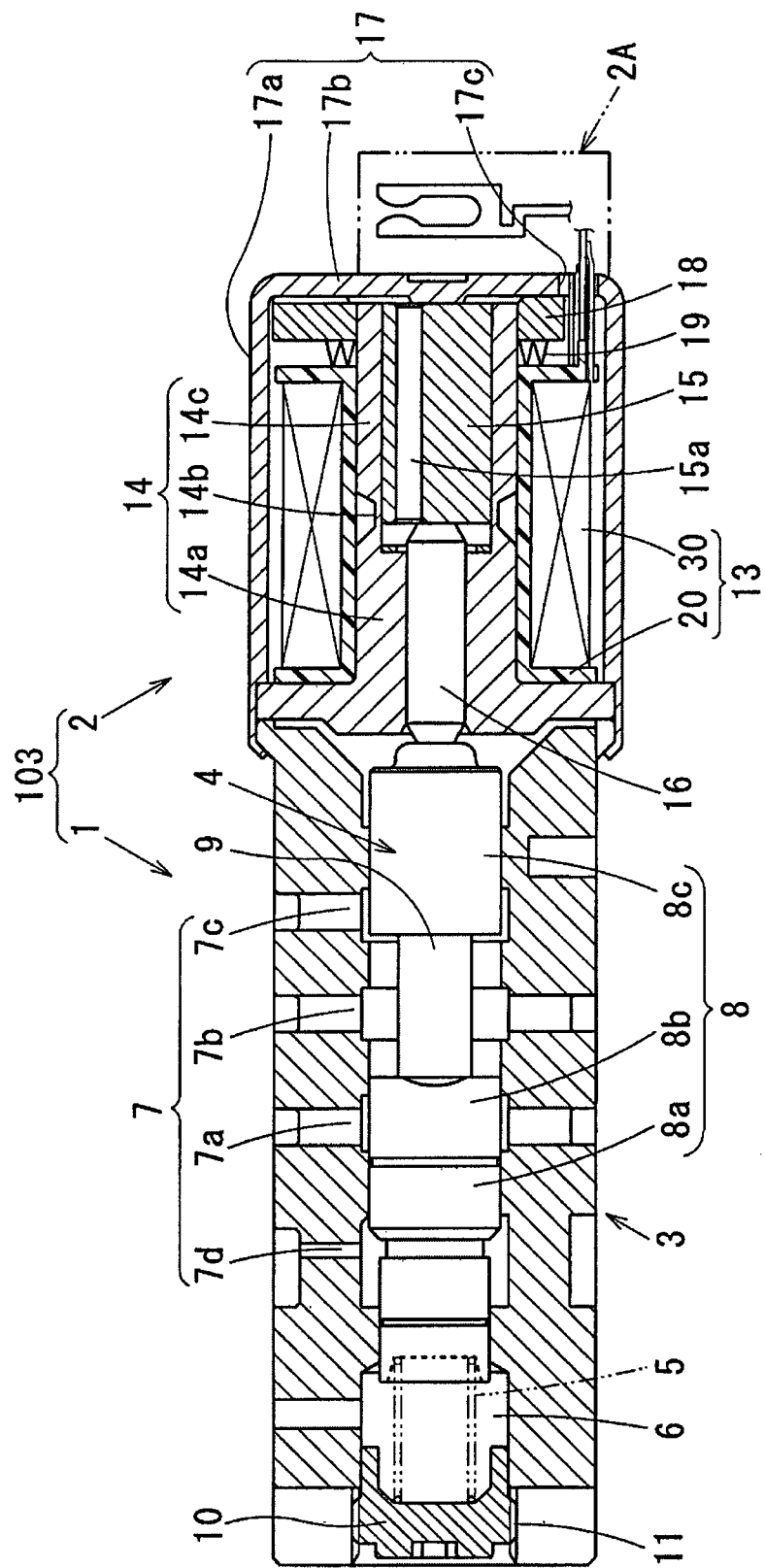
FIG. 1 is a schematic cross-sectional view illustrating a solenoid valve for hydraulic control used for an automatic transmission system for a vehicle according to an embodiment.
Figure 2:
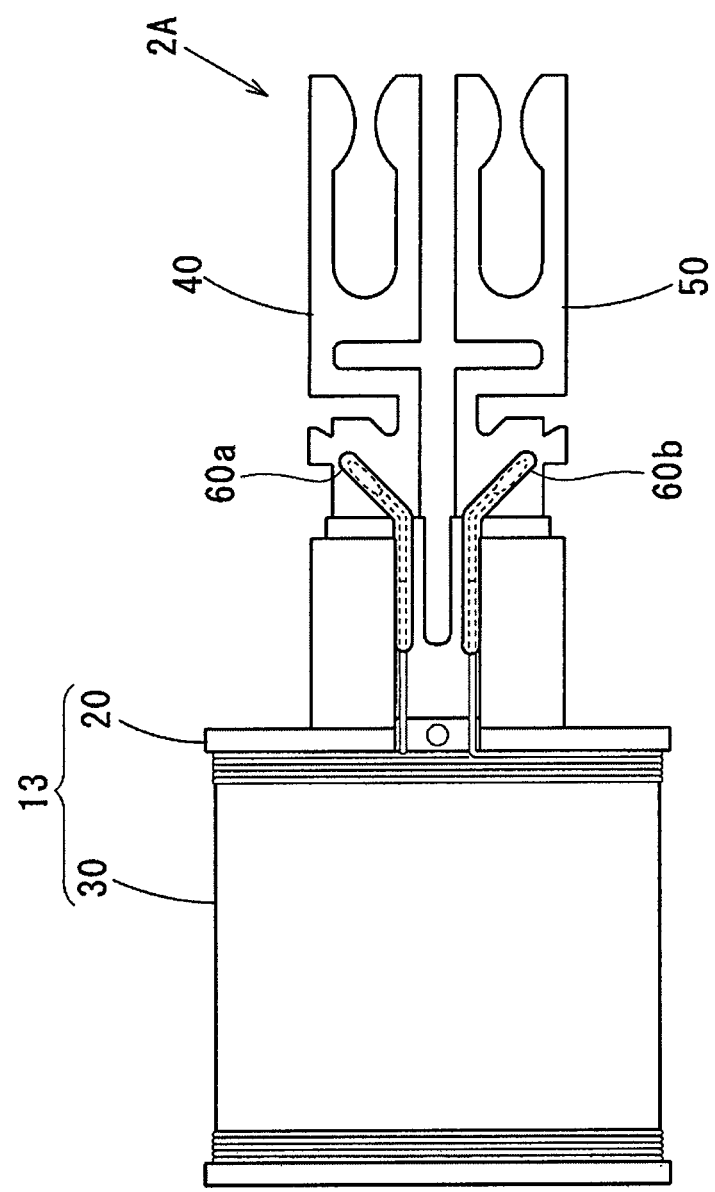
FIG. 2 is a front view illustrating a coil assembly before a solenoid coil and connection portions are installed into a case.

The solenoid coil 13 generally includes a bobbin 20 and a coil 30 wound around the bobbin 20 (see FIGS. 1 and 2).

Figure 3A:
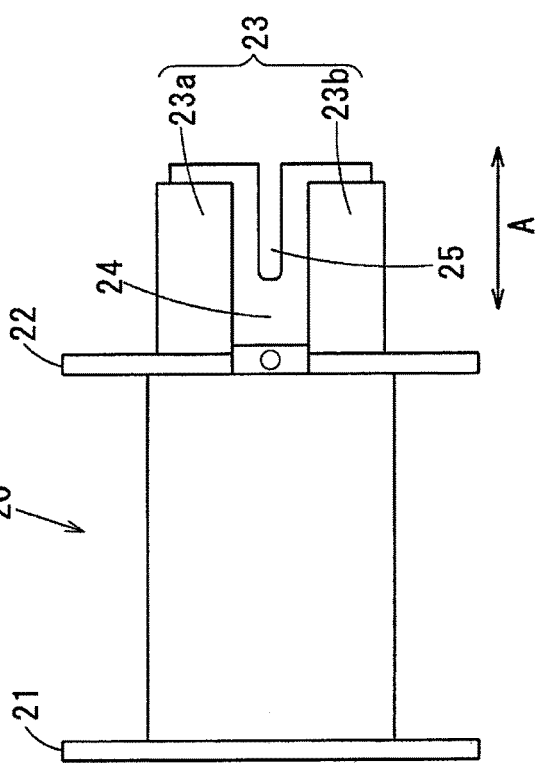
FIG. 3A is a front view of a bobbin.
Figure 3B:
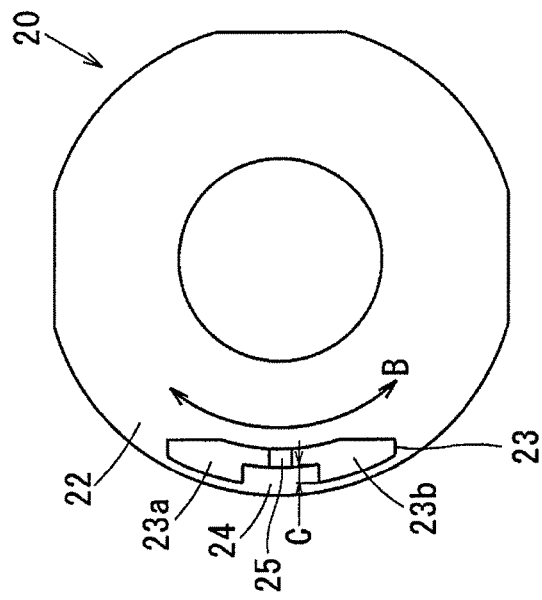
FIG. 3B is a side view of the bobbin.

As shown in FIGS. 3A and 3B, the bobbin 20 is made of resin and has a cylindrical shape. The bobbin 20 includes two flanges 21, 22 at both ends of the bobbin 20. A projecting portion 23 for connecting wire is integrally formed with one of the flanges 21, 22 (the flange 20 at the right side in FIG. 3A).

The projecting portion 23 causes connection to the power receiver 2A to be positioned outside of the case 17. The projecting portion 23 outwardly protrudes from a circumferential end of the flange 22 along the axial direction. The projecting portion 23 has a curved portion that extends along a plate width direction (a circumferential direction) B perpendicular to a protruding direction (the axial direction) A.

A groove 24 is formed on one surface (an outer circumferential surface) of the projecting portion 23. The groove 24 extends along the protruding direction A at the center of the projecting portion 23. The groove 24 separates the projecting portion 23 into a first protrusion 23a and a second protrusion 23b in the plate width direction B. The depth C of the groove 24 is set to be greater than outer diameters of coil lead wires 31, 32, as will be described later.

Furthermore, a slit 25 is formed at the center of the groove 24 to extend from a distal end of the projecting portion 23 toward a root of the projecting portion 23 along the protruding direction (the axial direction) A. The slit 25 passes through the projecting portion 23 to completely separate the first protrusion 23a and the second protrusion 23b from each other.

Figure 3C:
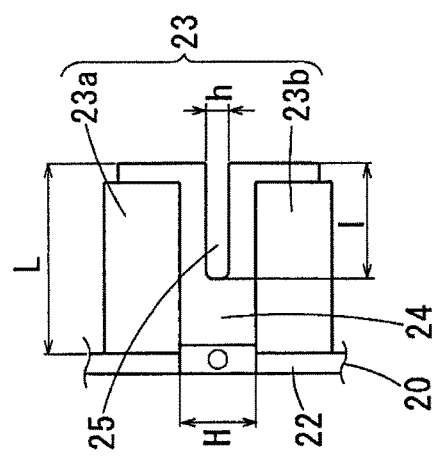
FIG. 3C is a front view of a projecting portion.

As shown in FIG. 3C, the width H of the groove 24 and the width h of the slit 25 satisfies H>h. Furthermore, the length L of the groove 24 and the length I of the slit 25 satisfies L>I.

The coil 30 is formed of an enameled wire as an insulating coated wire. The enameled wire is formed by applying an enameled coating (an insulating coating) on an outer surface of a wire element made of copper (Cu).

Figure 4A:
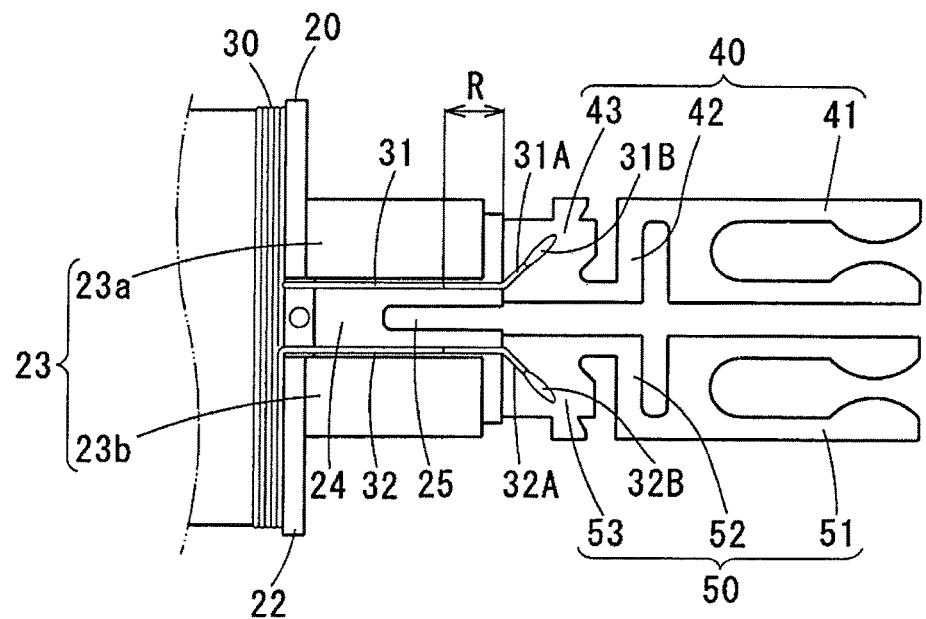
FIG. 4A is a front view of the coil assembly before insulating coating is applied thereto.

As shown in FIG. 4A, the coil 30 includes a winding start end and a winding terminal end as a first coil lead wire 31 and a second coil lead wire 32, respectively. The first coil lead wire 31 and the second coil lead wire 32 are led out along the projecting portion 23 from the side of the flange 22. Each of the coil lead wires 31, 32 has an exposed portion 31A, 32A formed by removing the insulating coating from a tip end of the each of the coil lead wires 31, 32. The exposed portions 31A, 32A serve as electrical connections.

The solenoid coil 13 is housed in the case 17 without being entirely molded with a mold resin, as will be described below.

Next, the power receiver 2A disposed outside of the case 17 will be described in detail below.

The power receiver 2A is a connector for an external equipment. The power receiver 2A includes a pair of terminals 40, 50 that serve as connecting terminals for the external equipment (i.e., the ECU 200). Hereinafter, the terminal 40 may be referred to as a "first terminal 40" and the terminal 50 may be referred to as a "second terminal 50" when differentiating those from each other.

Each of the terminals 40, 50 is formed of a metallic conductor plate having corrosion-resistance to the hydraulic oil such as an aluminum alloy. Each of the terminals 40, 50 has a rectangular shape as a whole. Plating may be applied to the surfaces of the terminals 40, 50.

Each of the terminals 40, 50 includes a terminal portion 41, 50 having a bifurcated shape at one end (a tip end) of each of the terminals 40, 50, as shown in FIG. 4A. Furthermore, each of the terminals 40, 50 includes an S-line portion 42, 52 at the center of each of the terminals 40, 50 and includes a base portion 43, 53 at the other end (a root portion). The terminals 40, 50 are fixed to the end of the first protrusion 23a and the end of the second protrusion 23b, respectively, at the side of the base portions 43, 53.

The terminals 40, 50 are fixed to the first protrusion 23a and the second protrusion 23b through insert-molding when the bobbin 20 is molded. Alternatively, the terminals 40, 50 may be fixed to the first and second protrusions 23a, 23b by bonding with an adhesive.

It should be noted that the relationship between the base portions 43, 53 of the terminals 40, 50 and the groove 24 is set such that the surfaces of the base portions 43, 53 and a bottom surface of the groove 24 form a common surface.

The connection portions are electrical connection portions between the first and second coil lead wires 31, 32 of the coil 30 and the first and second terminals 40, 50.

The first and second coil lead wires 31, 32 are led out along the projecting portion 23 from the flange 22 of the bobbin 20, as described above. Both the coil lead wires 31, 32 are commonly guided by the groove 24, as shown in FIG. 4A.

Figure 5A:
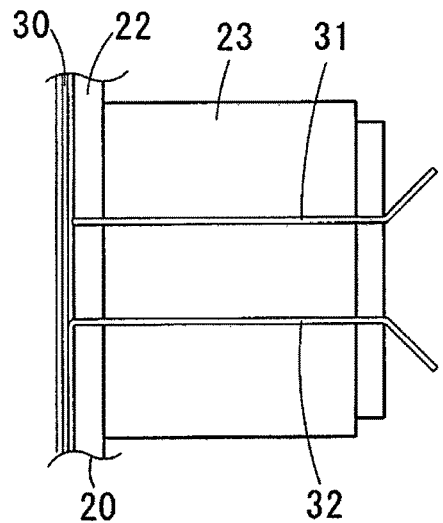
FIG. 5A is an enlarged view of connection portions according to a comparative example.
Figure 5B:
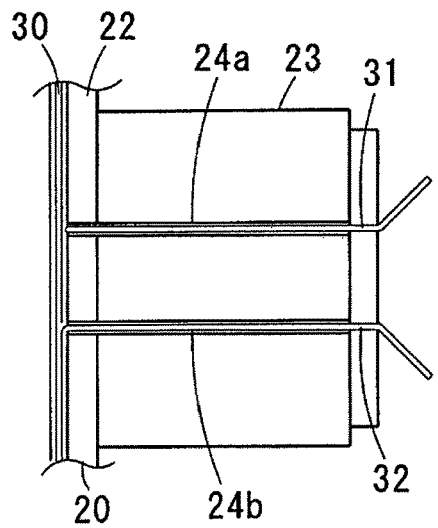
FIG. 5B is an enlarged view of connection portions according to a comparative example.

FIGS. 5A and 5B show a comparative example (not prior art) to explain the function of the groove 24.

As shown in FIG. 5A, when the groove 24 is eliminated, the pair of coil lead wires 31, 32 need to be led out along the outer surface of the projecting portion 23 for a long distance. Thus, the pair of coil lead wires 31, 32 may be removed from the projecting portion 23, or may be damaged by interfering with each other (e.g., disconnection may occur). Alternatively, FIG. 5B shows two grooves 24a, 24b formed for the lead wires 31, 32. Because the widths of the two grooves 24a, 24b are small, the lead wires 31, 32 may be damaged during arrangement of the wires 31, 32 along the two grooves 24a, 24b, respectively, or coating resin may not be sufficiently supplied.

In contrast, in the present embodiment, the groove 24 is formed as a single groove, and therefore has a widen width, as shown in FIG. 4A. Furthermore, the bottom surface of the groove 24 and the surfaces of the base portions 43, 53 form the common surface. Therefore, the pair of coil lead wires 31, 32 can be led to the base portions 43, 53 of the terminals 40, 50 along both edges of the bottom surface of the groove 24 (i.e., the side surfaces of the first and second projections 23a, 23b). As a result, each of the coil lead wires 31, 32 can be smoothly led to the corresponding first and second terminals 40, 50 without being damaged even if the coil lead wires 31, 32 are fine wires.

After the first and second coil lead wires 31, 32 are led to the first and second terminals 40, 50, end portions 31B, 32B of the exposed portions 31A, 32A are electrically connected to the base portions 43, 53 of the first and second terminals 40, 50 by a fixing tool such as a resistance welder (see FIG. 4A).

Next, each of the connection portions is individually and completely coated by a coating resin (a first coating portion, a second coating portion) 60a, 60b.

Figure 4B:
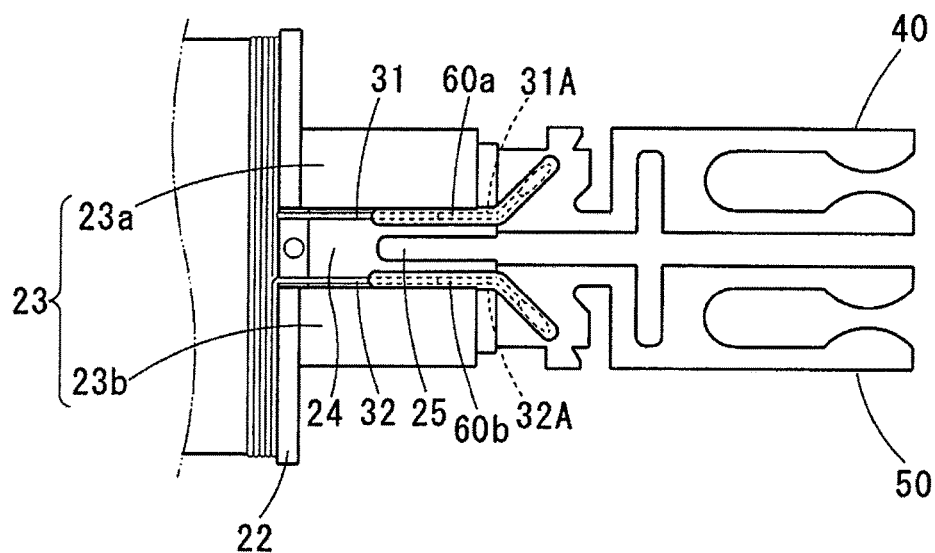
FIG. 4B is a front view of the coil assembly after insulting coating is applied thereto.

As shown in FIG. 4B, "completely and individually" means the entire surfaces of the exposed portions 31A, 32A including the actual electrical connection portions between the first and second coil lead wires 31, 32 and the first and second terminals 40, 50 (i.e., the welded portions 31B, 32B) are coated with the coating portions 60a, 60b, respectively.

Accordingly, the first and second coil lead wires 31, 32 have no portion where the wire element is exposed to an outside.

A fluorine thermosetting resin is used as the coating resin 60a, 60b, for example. The coating resin 60a, 60b is thermally cured after applying the coating resin 60a, 60b in a paste state to the connection portions. During the process, the slit 25 plays a significant role.

Figure 5C:
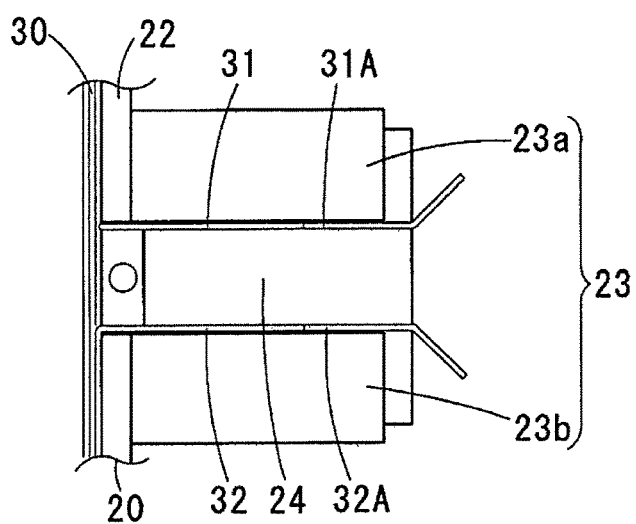
FIG. 5C is an enlarged view of connection portions according to a comparative example.

FIG. 5C shows a comparative example (not prior art) to explain the function of the silt 25.

When the slit 25 is eliminated, malfunction may occur in the insulating coating of the coating resin 60a, 60b regardless of the existence of the groove 24.

As shown in FIG. 5C, when there is the groove 24 without the slit 25, the coating resin 60a, 60b in a paste state applied to the groove 24 spreads along the groove 24 while being cured. Therefore, if an amount of the coating resin 60a, 60b is small, the entire surfaces of the exposed portions 31A, 32A of the lead wires 31, 32 may not completely coated with such a small amount of the coating resin 60a, 60b. In other words, a large amount of the coating resin 60a, 60b fully filled in the groove 24 may need.

In contrast, when the slit 25 is formed as described in the present embodiment, the coating resins 60a, 60b are blocked at a bordering edge of the slit 25 by surface tension when the coating resin 60a, 60b are cured. Therefore, the coating resin 60a, 60b are prevented from dripping from the slit 25. Therefore, even a small amount of the coating resin 60a, 60b can surely form the insulating coating for a required region (see FIG. 4B).

The length I of the slit 25 is set to be longer than the length R of a portion of the exposed portion 31A, 32A of the each of the coil lead wires 31, 32 that is along the projecting portion 23 (see FIGS. 3C and 4A).

As described above, the coil assembly is formed as shown in FIG. 2, and the coil assembly is housed in the case 17 without entirely molding the coil assembly with molding resin. In this case, the power receiver 2A (the tip end of the projecting portion 23 and the terminals 40, 50) can be exposed to an outside of the case 17 through a window 17c formed in the bottom portion 17b of the case (the yoke) 17 (see FIG. 1).

As shown in FIG. 1, the direction of each of the terminal portions 41, 51 can be adjusted by suitably bending the S-line portions 42, 52 to accord with the direction of the connecting terminal of the external equipment (the ECU 200).

According to the linear solenoid 2 of the embodiment, the following operation and effects are obtained.

The linear solenoid 2 has the structure of the bobbin 20 of the solenoid coil 13 and the connecting structure between the coil 30 and the pair of terminals 40, 50.

That is, in the bobbin 20, the projecting portion 23 capable of connecting the pair of terminals 40, 50 to the first and second coil lead wires 31, 32 is provided at an outside of the case 7. The two connection portions (electrical connections) between the coil 30 and the terminals 40, 50 are individually coated with the coating resins 60a, 60b.

Thus, the insulating coating is independently applied to only the connection portions exposed to the outside of the case 7, and therefore the portion of the solenoid coil 13 having the bobbin 20 and the coil 30 can be housed in the case 17 without being molded.

Furthermore, the insulation of the connection portions can be performed by individually coating the exposed portions 31A, 32A of the first and second coil lead wires 31, 32 with the coating resins 60a, 60b. Therefore, a necessary amount of resin for the coating can be reduced, and the size of the insulating portion can be decreased.

The slit 25 is formed in the projecting portion 23 to separate one of the connection portions from the other of the connection portions in the plate width direction B. By using the slit 25, the entire surfaces of each of the exposed portions 31A, 32A of the coil lead wires 31, 32 including the connection portions are coated with the coating resins 60a, 60b.

Accordingly, the entire surfaces of the exposed portions 31A, 32A of the coil lead wires 31, 32 can be surely coated with the coating resins 60a, 60b. Thus, the exposed portions 31A, 32A can be prevented from being directly exposed to the hydraulic oil. Furthermore, the two connection portions (the terminals 40, 50) are electrically and mechanically divided by the slit 25. Thus, it is possible to prevent a "contamination" from being deposited in the space between the connection portions, whereby occurrence of a short due to a conductive contamination can be avoided.

(Modifications to the Embodiment)

Figure 7A:
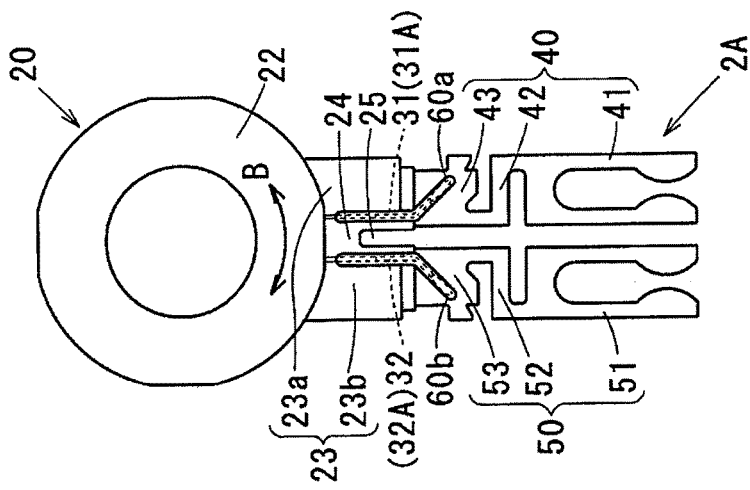
FIG. 7A is a front view of a coil assembly before a solenoid coil and connection portions are installed into a case according to a modification.
Figure 7B:
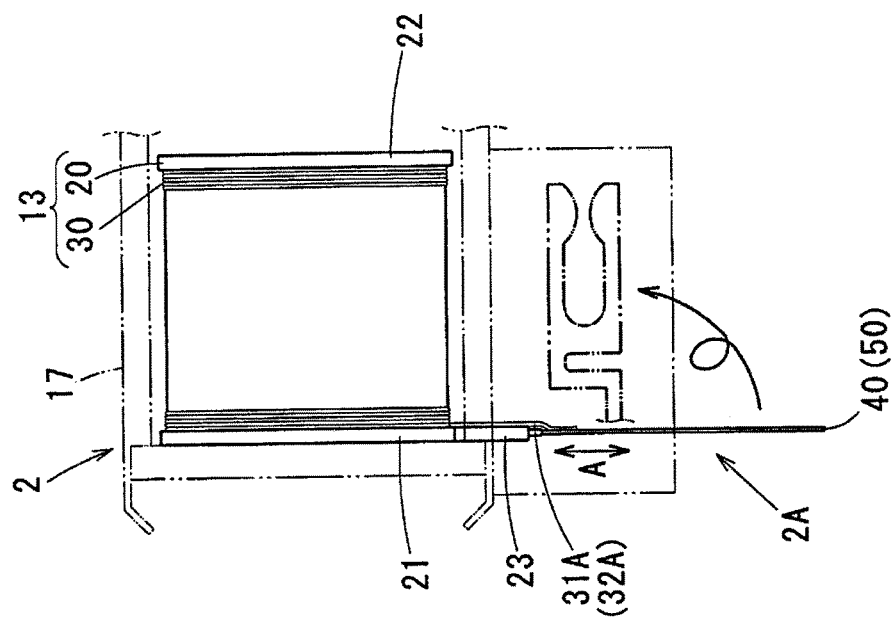
FIG. 7B is a side view of the coil assembly according to the modification.

In the liner solenoid 2, the power receiver 2A may be arranged at a radial side of the linear solenoid 2, as shown in FIG. 7, which illustrates a modification to the embodiment. The configuration of the modification is substantially the same as the embodiment except for the position and the protruding direction of the projecting portion 23. Therefore, the modification can obtain the same effects as the embodiment.

In FIG. 7, the projecting portion 23 is integrally formed with the flange 21 (the left side) in the bobbin 20 of the solenoid coil 13. Then, the projecting portion 23 outwardly protrudes from an outer circumferential edge of the flange 21 in the radial direction. The projecting portion 23 is divided into the first protrusion 23a and the second protrusion 23b in the plate width direction (the circumferential direction) B perpendicular to the protruding direction (the radial direction) A. The groove 24 and the slit 25 are formed in the projecting portion 23 along the protruding direction (the radial direction) A. Each of the connection portions (the electrical connection portions) of the first and second coil lead wires 31, 32 (the exposed portions 31A, 32A) and the terminals 40, 50 is individually coated with the coating resin 60a, 60b.

In the modification, the terminal portions 41, 51 of the terminals 40, 50 are bent to extend along the outer circumferential surface of the case 17. Thus, the connection with the external equipment can be easily performed without increasing the size of the linear solenoid 2 in the radial direction.

In the above-described embodiment, the present disclosure is applied to the hydraulic control device of the automatic transmission system for a vehicle as one example of the solenoid valve for hydraulic control. However, the present disclosure can be applied to any solenoid valve for hydraulic control having a simple insulating structure and required for solving problems generated from the peculiarity of the hydraulic oil (oil).

The above-described structures of the present disclosure can be summarized as below.

The slit 25 has the entire length I that is longer than the length R of the exposed portion 31A of the first coil lead wire 31 along the projecting portion 23 and the length R of the exposed portion 32A of the second coil lead wire 32 along the projecting portion 23.

Accordingly, the entire surfaces of the exposed portions 31A, 32A of the first and second coil lead wires 31, 32 can be surely coated with the coating resins 60a, 60b by applying the coating resins 60a, 60b along the slit 25.

The groove 24 is formed on one side surface of the projecting portion 23, and the first and second coil lead wires 31, 32 are arranged, in parallel with the slit 25, to extend within the groove 24.

Accordingly, the coil lead wires 31, 32 can be led to the base portions 43, 53 along the protrusions 23a, 23b while extending along the groove 24. Therefore, the coil lead wires 31, 32 can be led to the first and second terminals 40, 50 without being damaged even when the coil lead wires 31, 32 are formed of a fine wire.

The groove 24 serves as a common groove for the first and second coil lead wires 31, 32, and the slit 25 is formed at the center of the groove 24.

Accordingly, the coil lead wires 31, 32 can be led to the base portions 43, 53 of the terminals 40, 50 along the both edges of the bottom surface of the groove 24 to extend along the sides of the protrusions 23a, 23b. Therefore, the coil lead wires 31, 32 can be smoothly led to the first and second terminals 40, 50 without being damaged even when the coil lead wires 31, 32 are formed of a fine wire.

What is claimed is:

1. A solenoid valve for hydraulic control, the solenoid valve comprising:
    a spool valve that is used inside a hydraulic oil, the spool valve controlling a pressure of the hydraulic oil; and
    a linear solenoid that operates the spool valve to move along an axial direction, wherein
    the linear solenoid includes a resin cylindrical bobbin, a coil, and a case,
    the resin cylindrical bobbin includes two flanges at both ends of the resin cylindrical bobbin,
    the coil is formed of an insulating coated wire that is wound around the resin cylindrical bobbin, and
    the case houses the resin cylindrical bobbin and the coil, wherein
    the solenoid valve further includes:
        a projecting portion that is used for wire connection and protrudes from one of the two flanges of the resin cylindrical bobbin in a protruding direction along the axial direction, the projecting portion including an end surface located outside the case;
        a first terminal and a second terminal that are arranged to be away from each other in a plate width direction perpendicular to the protruding direction of the projecting portion, the first and second terminals serving as a pair of connecting terminals for an external equipment;
        a first coil lead wire that comes out from the one of the two flanges and extends along the projecting portion, the first coil lead wire including an exposed portion that protrudes from the end surface of the projecting portion and serves as a winding start end of the coil and electrically connected to the first terminal;
        a second coil lead wire that comes out from the one of the two flanges and extends along the projecting portion, the second coil lead wire including an exposed portion that protrudes from the end surface of the projecting portion and serves as a winding terminal end of the coil and electrically connected to the second terminal;
        a slit that is recessed from a distal end surface of the projecting portion toward a root portion of the projecting portion along the protruding direction, the slit separating an electrical connection between the first terminal and the first coil lead wire from an electrical connection between the second terminal and the second coil lead wire in the plate width direction;
        a first coating portion that is formed by coating an entire surface of the exposed portion of the first coil lead wire including the electrical connection between the first terminal and the first coil lead wire with a coating resin; and
        a second coating portion that is formed by coating an entire surface of the exposed portion of the second coil lead wire including the electrical connection between the second terminal and the second coil lead wire with a coating resin, and
    the first and second coil lead wires including the exposed portions extend outside the slit and are not located inside the slit.

2. The solenoid valve according to claim 1, wherein the slit has an entire length that is longer than a length of the exposed portion of the first coil lead wire along the projecting portion and a length of the exposed portion of the second coil lead wire along the projecting portion.

3. The solenoid valve according to claim 1, wherein a groove is formed on one side surface of the projecting portion, and
the first and second coil lead wires are arranged to extend, in parallel with the slit, within the groove.

4. The solenoid valve according to claim 3, wherein the groove serves as a common groove for the first and second coil lead wires, and
the slit is formed at a center of the groove.

* * * * *